United States Patent
De Marco

(10) Patent No.: US 6,855,200 B2
(45) Date of Patent: Feb. 15, 2005

(54) INORGANIC COHESION AGENT FOR SELF-COMPACTING CEMENT PASTES

(75) Inventor: Tiziana De Marco, Curno (IT)

(73) Assignee: Italcementi S.p.A., Bergamo (IT)

(*) Notice: Subject to any disclaimer, the term of this patent is extended or adjusted under 35 U.S.C. 154(b) by 8 days.

(21) Appl. No.: 10/760,903

(22) Filed: Jan. 20, 2004

(65) Prior Publication Data

US 2004/0149173 A1 Aug. 5, 2004

Related U.S. Application Data

(62) Division of application No. 09/907,527, filed on Jul. 17, 2001, now abandoned.

(30) Foreign Application Priority Data

Jul. 25, 2000 (IT) .................................. MI2000A1699

(51) Int. Cl.⁷ ......................... C04B 14/04; C04B 14/28
(52) U.S. Cl. ..................... 106/737; 106/738; 106/796; 106/817
(58) Field of Search .............................. 106/737, 738, 106/817, 796

(56) References Cited

U.S. PATENT DOCUMENTS 6,264,737 B1 * 7/2001 Liotta et al. ................ 106/724

* cited by examiner

*Primary Examiner*—Paul Marcantoni
(74) *Attorney, Agent, or Firm*—Hedman & Costigan, P.C.

(57) ABSTRACT

The present invention relates to an inorganic cohesion agent for self-compacting cement pastes consisting of a co-precipitated $SiO_2/CaCO_3$ mixture.

6 Claims, 7 Drawing Sheets

COHESION EVALUATION IN THE FRESH STATE
Paste 2: concrete with experimental $SiO_2/CaCO_3/CSH$ mixture COHESION EVALUATION IN THE FRESH STATE
Paste 2: concrete with experimental $SiO_2/CaCO_3/CSH$ mixture COHESION EVALUATION IN THE FRESH STATE
Paste 3: concrete as such

COHESION EVALUATION IN THE FRESH STATE
Paste 4: concrete with calcareous filler COHESION EVALUATION IN THE FRESH STATE
Paste 9: concrete as such - increase in cement dosage

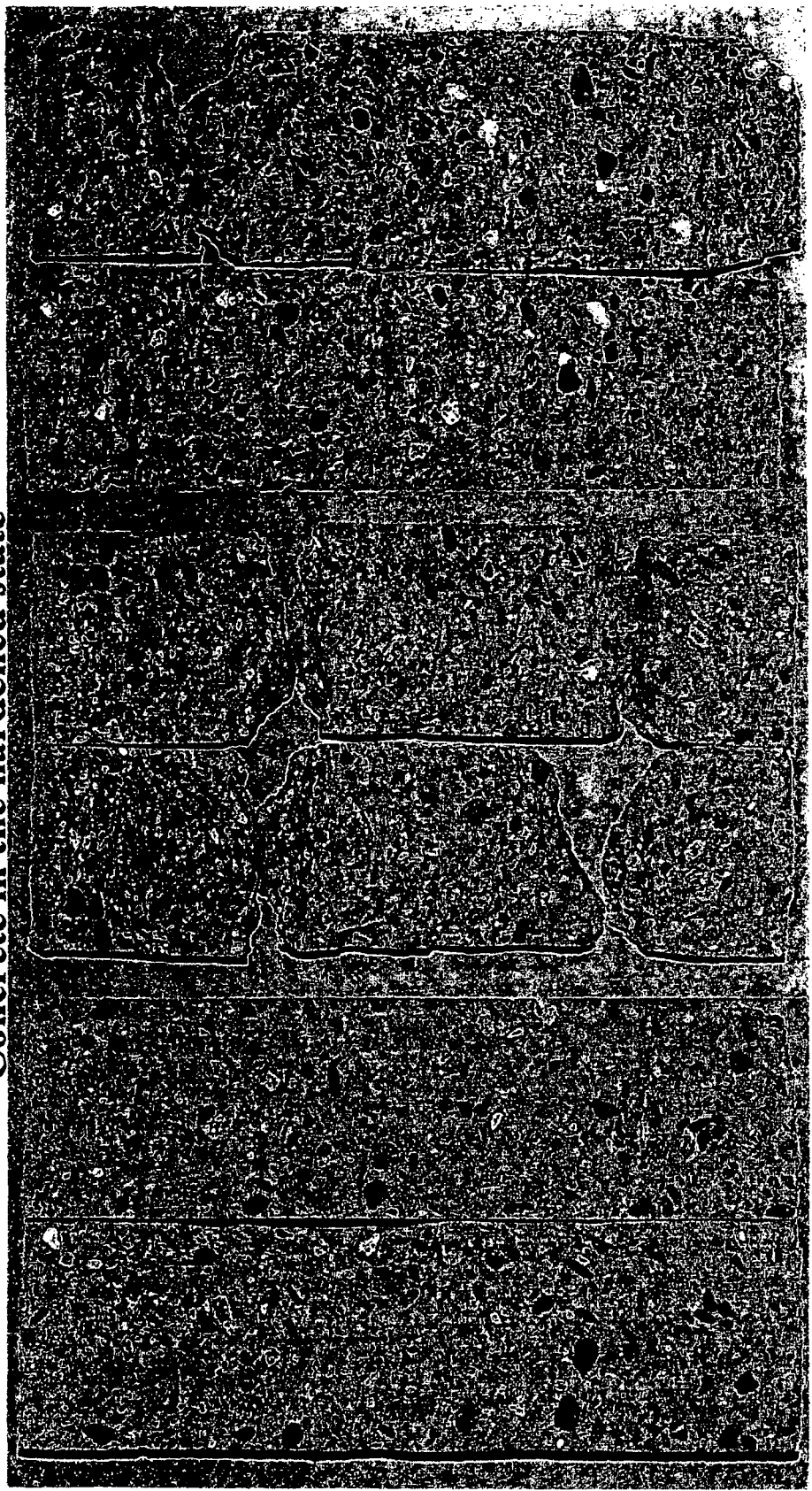
SEGREGATION EVALUATION
Concrete in the hardened state
Figure 5: paste 1-with the mixture according to the invention
Figure 6: paste 3 -as such
Figure 7: paste 4-with calcareous filler

INORGANIC COHESION AGENT FOR SELF-COMPACTING CEMENT PASTES

This application is a division of Ser. No. 09/907,527, filed Jul. 17, 2001, now abandoned and claims priority to Italian Application Serial No. MI2000A 001699, Jul. 25, 2000.

The present invention relates to an inorganic cohesion agent for self-compacting cement pastes.

Self-compacting concrete (SCC), which was developed in Japan in the eighties', is well known in literature (Okamura, H.; Kunishima, M.; Maekawa, K. and Ozawa, K.; High Performance Concrete based on the Durability Design of Concrete Structures, Proceedings of EASEC-2, Nr. 1, January 1989, pages 445–450). This self-compacting concrete consists of cement conglomerates whose fluidity (self-levelling), in the fresh state, is such that they can be used without any need for vibration or compacting stress.

These self-compacting cement pastes must have excellent properties both when fresh (fluidity, cohesion and absence of segregation), and in the hardened state (mechanical resistance and durability). These characteristics can be obtained by contemporaneously adopting a low water/cement ratio, the use of super-fluidifying additives and the addition of cohesion or viscosizing agents.

The main characteristic of self-compacting concrete, as it is self-levelling, is an extremely high fluidity: this means that the slump test measurement is so high (>240 mm) as to be no longer significant; resort is therefore made to the slump flow measurement which must reach values of at least 600 mm.

The other essential characteristic of a self-compacting concrete, in addition to a considerably high fluidity, is the absence of bleeding and segregation. The absence of segregation is obtained by the addition of extremely effective mineral fillers such as, for example, silica fume and/or viscosizing agents of an organic nature, such as products based on modified cellulose.

As far as the properties in the hardened state are concerned, adequate mechanical resistance, in particular compression strength, and good durability of concrete structures can be obtained in a material with a high compacting degree.

The durability of concrete is correlated to the permeability in relation to the homogeneity of the phases of which it is composed (matrix, aggregate, transition zone). A reduced permeability of the material together with uniformity of the permeability values in the different zones of a cementitious end-product, indicate a good compacting degree.

There is no absolute measurement of a permeability coefficient, but there are various methods which measure different fluid transport mechanisms through the material. One of these methods is gas permeability, in particular air permeability.

The objective of the present invention is to identify an alternative agent to those existing in the state of the art for providing cohesion and compacting characteristics, thus obtaining a self-compacting concrete which contemporaneously has a high stability, viscosity and rest cohesion (i.e. absence of bleeding and segregation) and good compression strength values.

An object of the present invention relates to an inorganic cohesion agent for self-compacting cement pastes, consisting of a co-precipitated $SiO_2/CaCO_3$ mixture.

In particular, the composite material made up of the co-precipitated mixture of silica and calcium carbonates which forms the agent according to the present invention is obtained starting from natural or synthetic calcium silicates, crystalline or amorphous, hydrated or non-hydrated, or their mixtures, which, by reaction with $CO_2$ in water, can allow solid co-precipitated mixtures of $SiO_2$ and $CaCO_3$ to be obtained.

The starting materials can also be cements or cement clinkers.

The co-precipitated $SiO_2/CaCO_3$ mixtures according to the present invention can be used as such, as deriving from the production process, or in aqueous suspension, or they can be used in the dry state, after evaporation/separation of the whole or part of the water.

The co-precipitated $SiO_2/CaCO_3$ mixture according to the present invention preferably has a weight ratio $SiO_2/CaCO_3$ ranging from 1.2 to 0.1. It can contain up to 50% of other components in mass, among which calcium silicates (non-reacted or transformed), for example those indicated as CSH, and/or metallic oxides.

The specific surface measured with the BET method can range from 20 to 100 $m^2/g$.

An example of a process for the production of silica and silica and calcium carbonate composites, starting from calcium silicates is described in the patent CA U.S. Pat. No. 1,122,779. This patent describes a process for the production of silica, in which calcium silicate crystals are put in contact with $CO_2$ in the presence of water and converted into silica, having the same configuration as silicate crystals, and into calcium carbonate particles attached to amorphous silica particles.

This $SiO_2/CaCO_3$ mixture (i.e. the mixture according to the patent) is preferably treated with inorganic acids in order to decompose the calcium carbonate, separate the calcium salts and obtain pure amorphous silica or it is used as such without any type of treatment or separation.

A further object of the present invention is a self-compacting concrete obtained with the use of an inorganic cohesion agent consisting of a co-precipitated $SiO_2/CaCO_3$ mixture.

The present invention also relates to recovery mortars and pastes which can be obtained by the use of an inorganic cohesion agent consisting of a co-precipitated $SiO_2/CaCO_3$ mixture.

The co-precipitated $SiO_2/CaCO_3$ mixture is preferably used in doses ranging from 1 to 30% with respect to the weight of the cement, in particular from 5 to 15%.

The main advantage of the agent according to the present invention lies in its being a cohesion agent which, as well as guaranteeing segregation-absence properties in the concrete better than or equivalent to those provided by the additives and/or mineral fillers normally used, at the same time allows the production of a long-lasting concrete with excellent compression strength.

In fact, although the use of some additives, such as precipitated silica alone or an organic viscosizing agent, on the one hand allows better cohesion of pastes in the fresh state, on the other hand it causes a drastic reduction in the compression strength with respect to a concrete with the same workability (free spreading), prepared with cement alone and without additives. Although concrete prepared with other mineral fillers such as calcareous fillers, has sufficiently high compression strength values (Rc), there are segregation phenomena in the fresh state. This segregation causes a lack of homogeneity in an end-product both during its laying and after hardening, with the formation of zones having different compacting degrees, thus showing different permeability values, in particular different air permeability coefficients. The characteristics and advantages of the agent according to the present invention are better illustrated by the following detailed description, referring to the following examples.

DESCRIPTION OF THE ENCLOSED FIGURES

FIGS. 1–4 are a photographic representation of pastes 2, 3, 4 and 9 respectively, in the fresh state;

FIGS. 5, 6 and 7 are a photographic representation of pastes 1, 3 and 4 respectively, in the hardened state;

Figure 1:

Nine pastes were in fact prepared, some of which containing the agent according to the present invention (pastes 1 and 2) and others containing additives according to the state of the art (pastes 1–9).

All the pastes were prepared with equal workability (slump flow ranging from 600 to 650 mm).

In particular, the materials with which the various pastes were prepared are the following: cement: CEM I 52, 5 R ULTRACEM Italcementi; aggregate: silico-calcareous SATAF, subdivided into five distinct sizes. The granulometric curve is of the discontinuous type with a maximum diameter equal to 20 mm;

| Sand | % with respect to the total | Particle size (mm) |
|---|---|---|
| 113 | 10 | 0.1 ÷ 0.5 |
| 103 | 10 | 0.5 ÷ 2 |
| 109 | 20 | 8 ÷ 15 |
| 10–15 | 30 | 10 ÷ 15 |
| 15–20 | 40 | 15 ÷ 20 | acrylic superfluidifying additive: 2000AC AXIM.

The concrete is prepared using a forced mixer with a vertical axis and the characteristics were evaluated by means of the following methods:

volume mass (kg/m$^3$): UNI 6394 method, $1^{st}$ part;

free spreading (cm): slump test;

compression strength (MPa): EN 196/1 method;

air permeability: on samples having Φ=8 cm and h=3 cm, taken from the upper part and from the lower part of cylindrical test samples (Φ=12 cm and h=40 cm), after 28 days of curing. The cylindrical test samples were obtained by filling appropriate cylindrical moulds with concrete, without vibration, and leaving it to harden in a vertical position. For the air permeability measurements, a Hassler-type cell was used, calculating the permeability coefficient k by means of the following equation (proposed by Grube and Lawrence):

$$k = \frac{2\eta \cdot L \cdot V_2 \cdot P_2}{(p_1^2 - P_2^2) \cdot A};$$

wherein k=permeability coefficient, m$^2$;

η=viscosity of the fluid medium, Nsm$^{-2}$;

$V_2$=flow rate at the outlet, ms$^{-1}$;

$P_1$ and $P_2$=inlet and outlet pressure respectively, Nm$^{-2}$;

A=transversal surface of the test sample, m$^2$;

L=thickness of the sample, m;

cohesion and segregation evaluation: this evaluation was effected both in the fresh state, by evaluating the cohesion of the paste after its preparation and the possible presence of bleeding, and also in the hardened state, by evaluating the internal segregation of cylindrical test samples (Φ=12 cm; h=40÷50 cm), specifically prepared without vibration and broken by indirect tensile stress after two days of hardening; aesthetic evaluation: visual evaluation of the cylindrical test-samples, after hardening.

The cohesion agents present in pastes 1–9 of the following examples, are:

Paste 1: cohesion agent according to the present invention, co-precipitated $SiO_2/CaCO_3$ mixture alone;

Paste 2: cohesion agent according to the present invention, $SiO_2/CaCO_3/CSH$ mixture;

Paste 3 and 3 bis: no cohesion agent;

Paste 4: Carrara calcareous filler (comparative)

Paste 5: commercial precipitated $CaCO_3$ (comparative);

Paste 6: commercial precipitated silica ULTRASIL VN3 (Degussa) (comparative);

Paste 7: Elkem 940 Silica fume (comparative);

Paste 8: commercial organic viscosizing agent (comparative);

Paste 9: no cohesion agent, but increase in the cement dosage.

EXAMPLE 1

A 20 liter paste was prepared with the following composition:

PASTE 1 (with the agent according to the present invention, co-precipitated $SiO_2/CaCO_3$ mixture alone).

| Composition | Weight (kg) | Dosage (kg/m$^3$) |
|---|---|---|
| aggregate | 38.000 | 1900 |
| additions ($SiO_2/CaCO_3$ mixture) | 0.600 | 30 |
| Cement | 8.000 | 400 |
| paste water | 3.700 | 185 |
| acrylic additive | 0.160 | 8.0 |
| water*/cement ratio | 0.48 | |
| water*/(cement + additions) ratio | 0.44 | |

*the water also comprises the water contained in the acrylic additive.

Figure 8:
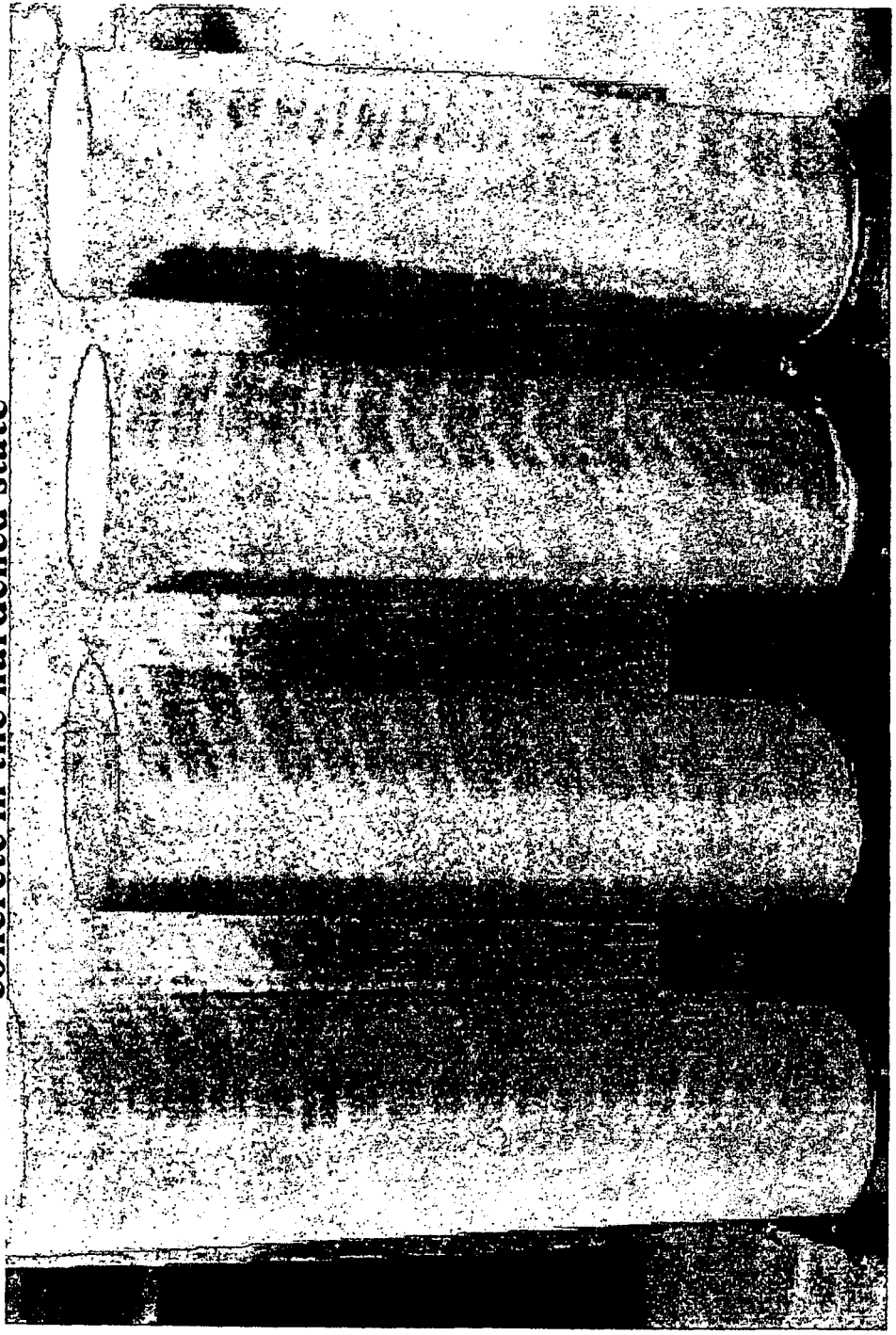
FIG. 8 is a photographic representation which shows in order test samples of pastes 1, 6, 4 and 3, after ejection.

Paste 1 has the following characteristics:

volume mass: 2405 kg/cm$^3$;

free spreading: 63 cm;

compression strength: see Table 1 below;

segregation evaluation: see FIG. 5;

aesthetic evaluation: after ejection, the test sample has a good aesthetic appearance (FIG. 8).

The use of the co-precipitated $SiO_2/CaCO_3$ mixture alone, according to the present invention, with dosages ranging from 1 to 30% with respect to the weight of the cement, in particular from 5 to 15%, allows a cohesive and non-segregable system to be obtained, of extremely easy application in the self-compacting concrete field.

TABLE 1

| | Rc (Mpa) | | | |
|---|---|---|---|---|
| Paste | 1 day | 2 days | 7 days | 28 days |
| Paste 1 | 37.2 | 51.2 | 61.0 | 77.1 |
| Paste 2 | 34.2 | 39.7 | 55.0 | 73.0 |
| Paste 3 | 27.2 | 40.0 | 44.8 | 53.4 |
| Paste 3 bis | 39.8 | 41.8 | 51.1 | 65.0 |
| Paste 4 | 39.4 | 43.5 | 50.3 | 61.5 |
| Paste 5 | 39.2 | 51.0 | 55.0 | 68.9 |
| Paste 6 | 32.6 | 38.4 | 49.2 | 55.7 |
| Paste 7 | 21.3 | 33.6 | 39.2 | 63.5 |
| Paste 8 | 4.4 | 14.0 | 24.2 | 31.8 |
| Paste 9 | 33.4 | 46.7 | 55.5 | 66.2 |

EXAMPLE 2

A 20 liter paste was prepared with the following composition:
PASTE 2 (with the agent according to the present invention, $SiO_2/CaCO_3/CSH$ mixture).

| Composition | Weight (kg) | Dosage (kg/m³) |
|---|---|---|
| aggregate | 38.000 | 1900 |
| additions ($SiO_2/CaCO_3/CSH$ mixture) | 0.600 | 30 |
| Cement | 8.000 | 400 |
| paste water | 4.200 | 210 |
| acrylic additive | 0.160 | 8.0 |
| water*/cement ratio | 0.54 | |
| water*/(cement + additions) ratio | 0.50 | |

*the water also comprises the water contained in the acrylic additive.

Paste 2 has the following characteristics:
volume mass: 2373 kg/cm³;
free spreading: 60 cm;
compression strength: see table 1;
evaluation of the air permeability coefficient k (m²) on samples having Φ=8 cm and h=3 cm, which form the upper and lower part of cylindrical test samples having Φ=12 cm and h=40 cm: see Table 2 below;
cohesion evaluation: see FIG. 1;
aesthetic evaluation: after ejection, the test sample has a good aesthetic appearance.

TABLE 2

| | k ($\times 10^{-17}$ m²) | |
|---|---|---|
| Paste | upper | lower |
| Paste 2 | 1.8 | 1.1 |
| Paste 3 | 23.1 | 1.3 |
| Paste 4 | 12.0 | 1.0 |
| Paste 5 | 17.4 | 4.7 |
| Paste 8 | 30.6 | 6.7 |

EXAMPLE 3

A 20 liter paste was prepared with the following composition:
PASTE 3 (without cohesion agent).

| Composition | Weight (kg) | Dosage (kg/m³) |
|---|---|---|
| aggregate | 38.000 | 1900 |
| additions | — | — |
| cement | 8.000 | 400 |
| paste water | 3.500 | 175 |
| acrylic additive | 0.136 | 6.8 |
| water*/cement ratio | 0.45 | |
| water*/(cement + additions) ratio | 0.45 | |

*the water also comprises the water contained in the acrylic additive.

The composition of the paste was selected so as to have a paste with a high segregation in order to enhance the improvement obtained as a result of the cohesion additives.
Paste 3 has the following characteristics:
volume mass: 2443 kg/m³;
free spreading: 63 cm;
compression strength: see table 1;
cohesion and segregation evaluation: see FIGS. 2 and 6;
aesthetic evaluation: after ejection, the test sample has a good aesthetic appearance (FIG. 8).

Example 3 was subsequently repeated with a 20 liter paste having the following composition:
PASTE 3 bis (without cohesion agent). /

| Composition | Weight (kg) | Dosage (kg/m³) |
|---|---|---|
| aggregate | 38.000 | 1900 |
| additions | — | — |
| cement | 8.600 | 430 |
| paste water | 3.800 | 190 |
| acrylic additive | 0.136 | 6.8 |
| water*/cement ratio | 0.45 | |
| water*/(cement + additions) ratio | 0.45 | |

Paste 3 bis has the following characteristics:
volume mass: 2429 kg/m³;
free spreading: 63 cm;
compression strength: see table 1;
aesthetic evaluation: after ejection, the test sample has a good aesthetic appearance.

EXAMPLE 4

A 20 liter paste was prepared with the following composition:
PASTE 4 (with Carrara calcareous filler).

| Composition | Weight (kg) | Dosage (kg/m³) |
|---|---|---|
| aggregate | 37.000 | 1850 |
| additions (calcareous filler) | 1.000 | 50 |
| cement | 8.000 | 400 |
| paste water | 3.500 | 175 |
| acrylic additive | 0.136 | 6.8 |
| water*/cement ratio | 0.45 | |
| water*/(cement + additions) ratio | 0.40 | |

*the water also comprises the water contained in the acrylic additive.

Figure 3:

Paste 4 has the following characteristics:
volume mass: 2444 kg/m³;
free spreading: 64 cm;
compression strength: see table 1;
cohesion and segregation evaluation: see FIGS. 3 and 7;
aesthetic evaluation: after ejection, the test sample has a good aesthetic appearance (FIG. 8).

Figure 2:

It is evident from the photographs provided in FIGS. 3 and 7, that a calcareous filler is not capable of increasing the cohesion of a "segregable" concrete such as that of Example 3, represented in FIGS. 2 and 6.

EXAMPLE 5

A 20 liter paste was prepared with the following composition:
PASTE 5 (with precipitated $CaCO_3$).

| Composition | Weight (kg) | Dosage (kg/m³) |
|---|---|---|
| aggregate | 38.000 | 1900 |
| additions (precipitated $CaCO_3$) | 0.480 | 24 |
| Cement | 8.000 | 400 |

-continued

| Composition | Weight (kg) | Dosage (kg/m³) |
|---|---|---|
| paste water | 3.700 | 185 |
| acrylic additive | 0.136 | 6.8 |
| water*/cement ratio | 0.47 | |
| water*/(cement + additions) ratio | 0.45 | |

*the water also comprises the water contained in the acrylic additive.

Paste 5 has the following characteristics:
volume mass: 2339 kg/cm³;
free spreading: 63 cm;
compression strength: see table 1;
evaluation of the air permeability coefficient k (m²): see Table 2;
aesthetic evaluation: after ejection, the test sample has a good aesthetic appearance.

EXAMPLE 6

A 20 liter paste was prepared with the following composition:
PASTE 6 (with silica $VN_3$).

| Composition | Weight (kg) | Dosage (kg/m³) |
|---|---|---|
| aggregate | 38.000 | 1900 |
| additions (silica $VN_3$) | 0.240 | 12 |
| Cement | 8.000 | 400 |
| paste water | 4.350 | 217.5 |
| acrylic additive | 0.160 | 8.0 |
| water*/cement ratio | 0.56 | |
| water*/(cement + additions) ratio | 0.54 | |

*the water also comprises the water contained in the acrylic additive.

Paste 6 has the following characteristics:
volume mass: 2397 kg/cm³;
free spreading: 60 cm;
compression strength: see table 1;
aesthetic evaluation: after ejection, the test sample has a good aesthetic appearance (FIG. 8).

EXAMPLE 7

A 20 liter paste was prepared with the following composition:
PASTE 7 (with silica fume).

| Composition | Weight (kg) | Dosage (kg/m³) |
|---|---|---|
| aggregate | 38.000 | 1900 |
| additions (silica fume) | 0.900 | 45 |
| Cement | 8.000 | 400 |
| paste water | 4.600 | 230 |
| acrylic additive | 0.160 | 8.0 |
| water*/cement ratio | 0.59 | |
| water*/(cement + additions) ratio | 0.53 | |

*the water also comprises the water contained in the acrylic additive.

Paste 7 has the following characteristics:
volume mass 2408 kg/cm³;
free spreading: 60 cm;
compression strength: see table 1;
aesthetic evaluation: after ejection, the test sample has a good aesthetic appearance.

EXAMPLE 8

A 20 liter paste was prepared with the following composition:
PASTE 8 (with organic viscosizing agent).

| Composition | Weight (kg) | Dosage (kg/m³) |
|---|---|---|
| aggregate | 38.000 | 1900 |
| additions (organic viscosizing agent Kelko-Krete) | 0.008 | 0.4 |
| Cement | 8.000 | 400 |
| paste water | 5.400 | 270 |
| acrylic additive | 0.160 | 8.0 |
| water*/cement ratio | 0.69 | |
| water*/(cement + additions) ratio | 0.69 | |

*the water also comprises the water contained in the acrylic additive.

Paste 8 has the following characteristics:
volume mass: 2365 kg/cm³;
free spreading: 60 cm;
compression strength: see table 1;
evaluation of the air permeability coefficient k (m²): see Table 2.

EXAMPLE 9

A 20 liter paste was prepared with the following composition:
PASTE 9 (without a cohesion agent, but with an increase in the dosage of cement).

| Composition | Weight (kg) | Dosage (kg/m³) |
|---|---|---|
| aggregate | 36.000 | 1800 |
| additions | — | — |
| Cement | 10.000 | 500 |
| paste water | 4.000 | 200 |
| acrylic additive | 0.170 | 8.5 |
| water*/cement ratio | 0.41 | |
| water*/(cement + additions) ratio | 0.41 | |

*the water also comprises the water contained in the acrylic additive.

Figure 4:

Paste 9 has the following characteristics:
volume mass: 2425 kg/cm³;
free spreading: 64 cm;
compression strength: see table 1;
cohesion evaluation: see FIG. 4;
aesthetic evaluation: after ejection, the test sample has a good aesthetic appearance.

From a comparison of the previous data, the following can be observed.

Pastes 1 and 6, i.e. the pastes containing, as cohesion agent, the agent according to the present invention and commercial precipitated silica, do not undergo any decomposition in the absence of vibration, which on the contrary occurs with pastes 3, 4 and 9, as can be seen from FIGS. 1–4 and 5–7.

With the same workability with respect to pastes 1, 3 and 4, however, paste 6, i.e. with commercial precipitated silica, requires an increase in the paste water in the order of 25% and in the acrylic superfluidifying agent of 18%.

Figure 9:
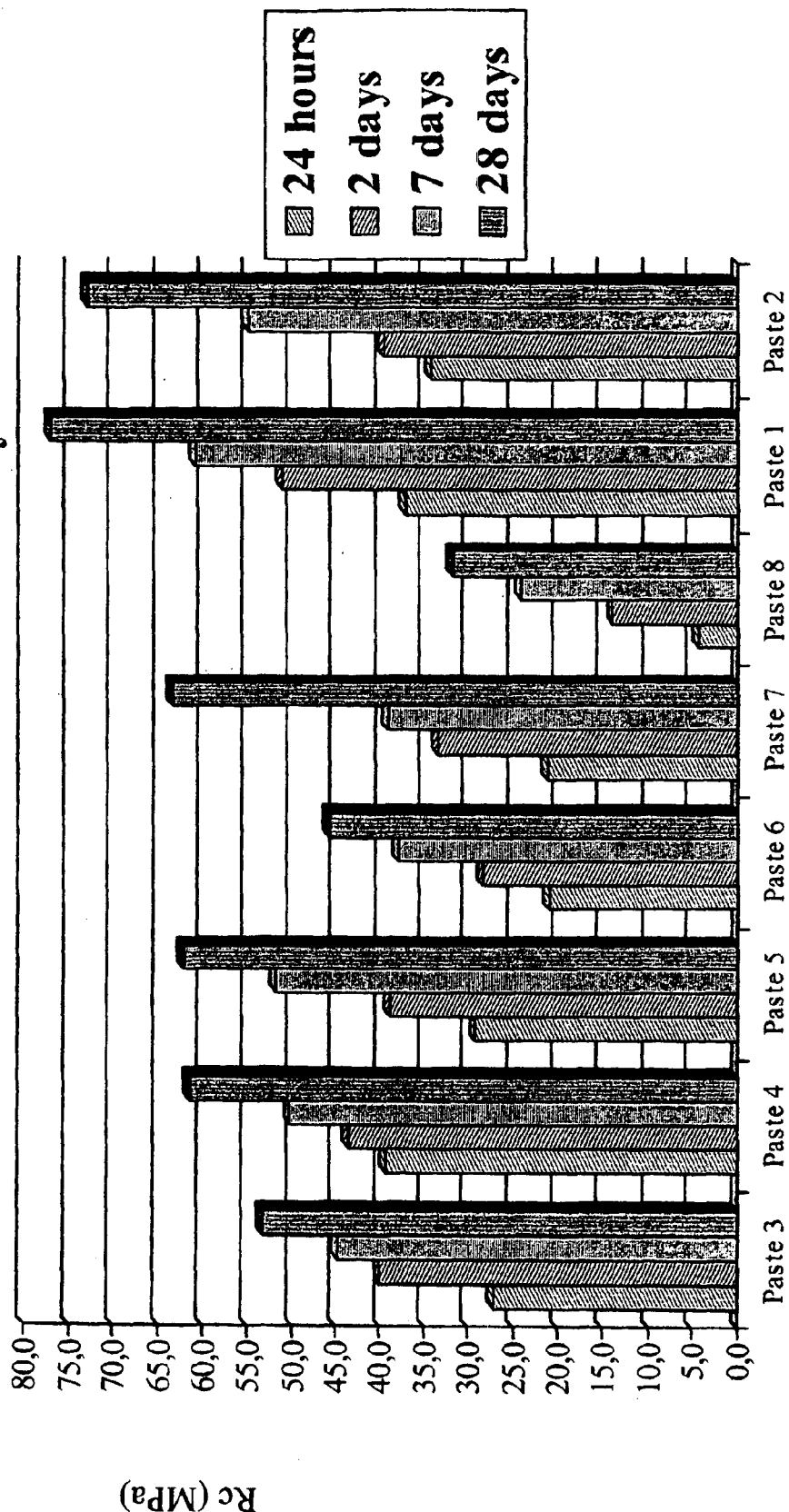
FIG. 9 is a graph which represents a comparison between the compression strengths of pastes 1–8.

The use, on the other hand, of the co-precipitated $SiO_2$/$CaCO_3$ mixture, according to the present invention, limits the increase in the quantity of paste water to 13%. The influence in the water/cement ratio negatively influences the compression strength of concrete with commercial silica, i.e.

paste 6. This effect, as can be seen from the graph in FIG. 9, is not observed for paste 1 which, for all the tests, has values similar to those of pastes 3 and 4.

This result is probably due to a rapid activation of the silica in the co-precipitated $SiO_2/CaCO_3$ mixture, together with a "filler" effect of the co-precipitated $SiO_2/CaCO_3$ mixture.

FIG. 8 shows that pastes 1 and 6 have the best finishing.

On comparing the compression strength values of the various pastes indicated in Table 1, it can be immediately seen how, with the same workability, pastes 1 and 2, i.e. the pastes containing the cohesion agent according to the present invention, have a very high compression strength with respect to the pastes with other additives according to the state of the art.

From the data provided in Table 2, it can observed that paste 2, containing the cohesion agent according to the present invention, has very low air permeability coefficient values and, above all, practically constant values at all points of the test sample. The pastes containing additives according to the state of the art, on the contrary, have extremely varying permeability coefficient values between different points of the test sample and this lack of homogeneity is a further confirmation of the fact that they do not have a good compacting degree.

The main advantage of the cohesion agent according to the present invention is that, in addition to guaranteeing non-segregation properties in the concrete which are better than or equivalent to those provided by the additives normally used, it also allows a long-lasting concrete to be obtained, with an excellent compression strength.

What is claimed is:

1. A self-compacting concrete which contains an inorganic cohesion agent which consists of a co-precipitated $SiO_2/CaCO_3$ mixture.

2. The self-compacting concrete according to claim 1, wherein the co-precipitated mixture of silica and calcium carbonates is obtained starting from natural or synthetic calcium silicates, crystalline or amorphous, hydrated or non-hydrated, or their mixtures, cements or cement clinkers.

3. The self-compacting concrete according to claim 1, wherein the co-precipitated $SiO_2/CaCO_3$ mixture is in aqueous suspension.

4. The self-compacting concrete according to claim 1 wherein the co-precipitated $SiO_2/CaCO_3$ mixture is present in an amount ranging from 1 to 30% with respect to the weight of the cement.

5. The self-compacting concrete according to claim 1, wherein the co-precipitated $SiO_2/CaCO_3$ mixture is present in amounts ranging from the 5 to 15% with respect to the weight of the cement.

6. The self compacting concrete according to claim 1 wherein the cohesion agent consists of a co-precipitated $SiO_2/CaCO_3$ mixture wherein the co-precipitated $SiO_2/CaCO_3$ mixture has a weight ratio $SiO_2/CaCO_3$ ranging from 1.2 to 0.1.

* * * * *